US008988030B2

(12) United States Patent
Hernandez Marti et al.

(10) Patent No.: US 8,988,030 B2
(45) Date of Patent: Mar. 24, 2015

(54) POWER CONTROL FOR ELECTRICAL APPLICATIONS OVER LONG CABLES

(71) Applicant: Schlumberger Technology Corporation, Sugar Land, TX (US)

(72) Inventors: Ramon Hernandez Marti, Houston, TX (US); John Parry, Richmond, TX (US); Dudi Rendusara, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 164 days.

(21) Appl. No.: 13/675,829

(22) Filed: Nov. 13, 2012

(65) Prior Publication Data

US 2014/0132192 A1   May 15, 2014

(51) Int. Cl.
*H02P 7/00* (2006.01)
*H02P 29/00* (2006.01)
*G05F 1/10* (2006.01)
*E21B 41/00* (2006.01)

(52) U.S. Cl.
CPC ...... *H02P 29/00* (2013.01); *G05F 1/10* (2013.01); *H02P 29/0033* (2013.01); *E21B 41/0085* (2013.01)
USPC ...... 318/432; 318/400.01; 318/722; 318/799; 318/801; 318/400.15; 175/40; 175/50; 175/195; 166/66.4; 166/54.1; 166/65.1

(58) Field of Classification Search
CPC ............................................. B60W 10/08
USPC .......... 318/400.01, 400.14, 400.15, 721, 799, 318/801, 432, 139, 430, 434, 438, 722; 175/40, 50, 189, 195; 166/66.4, 54.1, 166/65.1
See application file for complete search history.

(56) References Cited

U.S. PATENT DOCUMENTS

| | | | |
|---|---|---|---|
| 5,654,883 A * | 8/1997 | Takehara et al. | 363/79 |
| 5,736,936 A | 4/1998 | Bombay et al. | |
| 6,414,455 B1 * | 7/2002 | Watson | 318/432 |
| 6,489,742 B2 | 12/2002 | Lumsden | |
| 6,522,119 B1 | 2/2003 | Hernandez | |
| 6,593,770 B2 | 7/2003 | Hernandez-Marti | |
| 7,586,313 B2 | 9/2009 | Hernandez-Marti et al. | |
| 7,839,025 B2 | 11/2010 | Besser et al. | |
| 8,232,760 B2 | 7/2012 | Lu et al. | |
| 2006/0052903 A1 * | 3/2006 | Bassett | 700/282 |
| 2011/0051297 A1 * | 3/2011 | Knox et al. | 361/23 |
| 2012/0081088 A1 * | 4/2012 | Park | 323/282 |
| 2012/0206074 A1 | 8/2012 | Kureck et al. | |

OTHER PUBLICATIONS

International Search Report and the Written Opinion for International Application No. PCT/US2013/066741 dated Mar. 4, 2014.

* cited by examiner

*Primary Examiner* — Antony M Paul
(74) *Attorney, Agent, or Firm* — Trevor Grove

(57) ABSTRACT

This disclosure is drawn to methods, systems, devices and/or apparatus related to power control in applications over long cables. Specifically, the disclosed methods, systems, devices and/or apparatus relate to power control that considers the maximum power available at the end of a long cable (or from a battery) to a load over a broad range of load conditions. Some example systems may include a power supply located at the Earth's surface and a power converter coupled to the power supply via a cable having a first end coupled to the power supply and a second end coupled to the power converter. Some example power converters may be configured to measure the power being consumed by the electrical load in the well, and adjust operating parameter(s) of the electrical load based, at least in part, on the maximum power available at the second end of the cable.

16 Claims, 4 Drawing Sheets

POWER CONTROL FOR ELECTRICAL APPLICATIONS OVER LONG CABLES

CROSS-REFERENCE TO RELATED APPLICATIONS

None.

FIELD OF THE INVENTION

Aspects relate to drilling of wellbores. More specifically, aspects relate to power control for electrical applications over long cables used in wellbores.

BACKGROUND INFORMATION

In some deep and highly deviated wellbores, power is needed for many operations, including, for example, conveying evaluation tools, taking formation cores, operating valves, milling plugs, and other mechanical operations. Electrical motors (such as direct current powered motors) are commonly used for such operations. Due to the depth of some wells in which motors must operate and the length of cables needed to power such motors, motor performance is severely diminished.

In oil wells and with cables that may be 30,000 feet or longer, motors must operate continuously at the peak power the cable can convey, and traditional motor control, based on maintaining either velocity or torque, is not appropriate for reliable and efficient operation. Similarly, actuators, power converters and signal generators may cause a demand of peak power above what the power delivery system can provide when transient the load impedance changes while operating at or near maximum power. Peak power limitations similar to those described for long cables also exist in battery powered systems, where peak power demands can shorten battery autonomy.

SUMMARY

In a first aspect, some example systems for powering an electrical load may include a power supply and a power converter coupled to the power supply via a cable having one end coupled to the power supply and another end coupled to the power converter. Some example power converters may measure the power being consumed by the electrical load, and adjust operating parameter(s) of the electrical load based on the maximum power available at the end of the cable.

In a second aspect, some example systems for powering an electrical load in a well may include a battery and a power converter coupled to the battery. The power converter may measure the power being consumed by the electrical load in the well, and adjust operating parameter(s) of the electrical load based on the maximum power available from the battery.

In a third aspect, some example methods of controlling an electrical load in a well are provided. The electrical load may be coupled to a power converter via a cable having one end coupled to a surface power supply and another end coupled to the power converter. Some example methods may include determining the power being consumed by the electrical load in the well, determining the maximum power available at the end of the cable near the power converter, and adjusting operating parameter(s) of the electrical load such that the power being consumed by the electrical load equals and/or approximates the maximum power available at the end of the cable near the power converter.

BRIEF DESCRIPTION OF THE DRAWINGS

The foregoing and other features of the present disclosure will become more fully apparent from the following description and appended claims, taken in conjunction with the accompanying drawings. Understanding that these drawings depict several embodiments in accordance with the disclosure and are, therefore, not to be considered limiting of its scope, the disclosure will be described with additional specificity and detail through use of the accompanying drawings.

DETAILED DESCRIPTION

Figure 1:
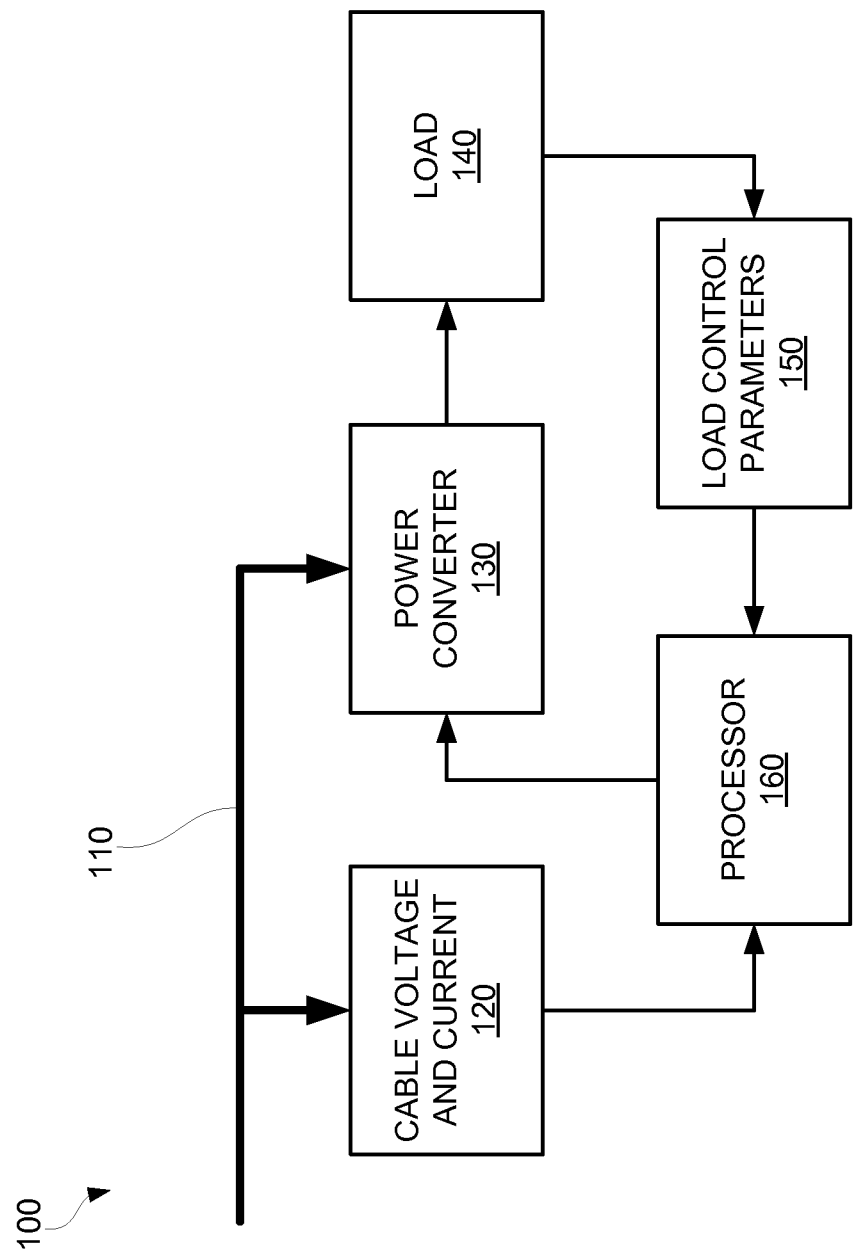
FIG. 1 is a graphical representation of an example system for powering an electrical load in a well.

In the following detailed description, reference is made to the accompanying drawings, which form a part hereof. In the drawings, similar symbols identify similar components, unless context dictates otherwise. The illustrative embodiments described in the detailed description and drawings are not meant to be limiting and are for explanatory purposes. Other embodiments may be utilized, and other changes may be made, without departing from the spirit or scope of the subject matter presented herein. It will be readily understood that the aspects of the present disclosure, as generally described herein, and illustrated in the drawings, may be arranged, substituted, combined, and designed in a wide variety of different configurations, each of which are explicitly contemplated and made part of this disclosure.

This disclosure is drawn to methods, systems, devices and/or apparatus related to power control in applications over long cables. Specifically, the disclosed methods, systems, devices and/or apparatus relate to power control that considers the maximum power available at the end of a long cable (or from a battery) to a load over a broad range of load conditions.

The present disclosure contemplates that motors are conventionally controlled to operate at a constant speed, to control the speed of conveyance or the cutting operation of a drill bit. Constant speed may be equated to driving the motor at constant voltage. Motors may also be operated at constant torque, to produce a controlled force, which may be equated to driving the motor at constant current. When a motor operates at constant speed near the maximum power available through a cable and the motor meets a restriction (e.g., the drilling bit lifts a burr), the torque requirement increases. The increased torque causes an increase in current that, over the cable resistance, decreases the power available to the motor. This decreased power available causes a serious speed reduction that may stall the motor.

Generally, the present disclosure considers a complete system, including a surface power supply, a cable, a power converter, and an electrical load. Some example systems adjust the power converter operation not to exceed the maximum power available at the end of the cable.

FIG. 1 is a graphical representation of an example system 100 for powering a load 140 in a well. Cable 110 may extend into a well and be operatively coupled to a power convertor 130. Cable voltage and cable current 120 may be measured in the well adjacent and/or at power convertor 130. Power converter 130 may be operatively coupled to load 140. Load 140 may have associated load control parameters 150 (e.g., load voltage, load current) related to the operation of load 140. Cable voltage and cable current 120 and load control parameters 150 may be inputted to a processor 160. Processor 160 may be coupled to power converter 130 to adjust the operating parameter(s) of load 140 to approximate and/or equal the maximum power available at the end of cable 110.

Knowing cable voltage and cable current 120 allows for calculating the maximum power that is available to the system 100 at or near the end of cable 110. Cable voltage and cable current 120 relate to the cable's resistance and the surface power supply as follows:

$$V_s = V + I \cdot R_c,$$

where $V_s$ is the surface supply voltage and $R_c$ is the cable resistance. Taking such measurements at different regimes results in the following equations:

$$V_s = V_1 + I_1 \cdot R_c,$$

$$V_s = V_2 + I_2 \cdot R_c$$

and subtracting the two expressions:

$$0 = V_1 - V_2 + (I_1 - I_2) \cdot R_c \to R_c = \frac{V_1 - V_2}{I_1 - I_2}.$$

Replacing the value of the cable resistance $R_c$ in one of the two initial equations provides the value of the surface supply.

The present disclosure contemplates that maximum power is transmitted on a cable when the voltage at the load end of the cable is half of the surface power supply voltage (i.e., $$\left(\text{i.e., } \frac{V_s}{2}\right),$$

or the point where the load matches the source impedance. The present disclosure further contemplates that this occurs when the cable current is $$\frac{V_s}{2R_c},$$

which leads to the following known formulas relating power to voltage and resistance:

$$W_{max} = \frac{V_s^2}{4R_c}$$

and $$I_{max} = \frac{V_s}{2R_c}.$$

Measurements to determine the cable resistance may be conducted periodically and/or continuously during a downhole tool's operation. As the tool progresses in the well, ambient temperature changes and the current passing to the cable may contribute to an increased temperature, resulting in an increase in the cable resistance. While such temperature changes may be slow, they may be tracked to maintain accuracy of the power model.

The present disclosure contemplates that some surface power supply systems may implement feed forward compensation, modulating the surface voltage as a function of the current on the cable to maintain a constant downhole voltage. Both the downhole voltage and the cable resistance may be known to the surface power supply system and may be passed to the downhole tool using telemetry. The above equations may still apply by replacing the surface voltage $V_s$ with the downhole voltage and denominators as follows:

$$W_{max} = \frac{V_{dh}^2}{R_c}$$

and $$I_{max} = \frac{V_{dh}}{R_c}.$$

In some examples, a downhole tool may receive power from battery or batteries. In such examples, the minimum voltage and maximum current may be defined by the battery design and may be passed to the power convertor as system parameters.

In some examples, power converter 130 may be a switching converter of a type (e.g., buck, boost) appropriate for load 140 being driven. Example power converter 130 may provide better conversion efficiency than linear and/or static converters, and may operate in a constant power mode, thus adapting the load characteristics to the power supply impedance. A power converter 130 may have a voltage feedback loop and/or a current feedback loop, including, for example, a current feedback loop inside a voltage feedback loop.

In some examples having an electrical load, load control parameters 150 may include often load voltage ($V_l$) and load current ($I_l$) which may be used by processor 160 and power converter 130 to adjust operating conditions of load 140. The product of load voltage ($V_l$) and load current ($I_l$) may define the power absorbed by load 140, and may be used as another control variable and inputted in the following control equation:

$$V_l \times I_l \leq \eta \cdot W_{max},$$

where $\eta$ is the allowed conversion efficiency inherent to any power conversion system.

In some examples, processor 160 may be a specialized device for pulse width modulation and/or resonant modulation. In some examples, processor 160 may be a digital signal processor (DSP). Processor 160 may receive load control parameters 150 (e.g., load voltage and load current signals) and may control operation of power converter 130 to maintain the load conditions at a specified level. In some examples, processor 160 may also receive cable voltage and cable current 120 and may calculate the maximum power available at the end of the cable. In some examples, processor 160 may also calculate the power equation described above and may adjust an appropriate load parameter setting in an added control loop to maintain the inequality.

In some examples, a conventional buck converter may be placed between cable 110 and power converter 130. In examples having a direct current (DC) brushless motor, the inductance of the stator coils may be used to perform the voltage to current translation or impedance conversion.

Figure 2:
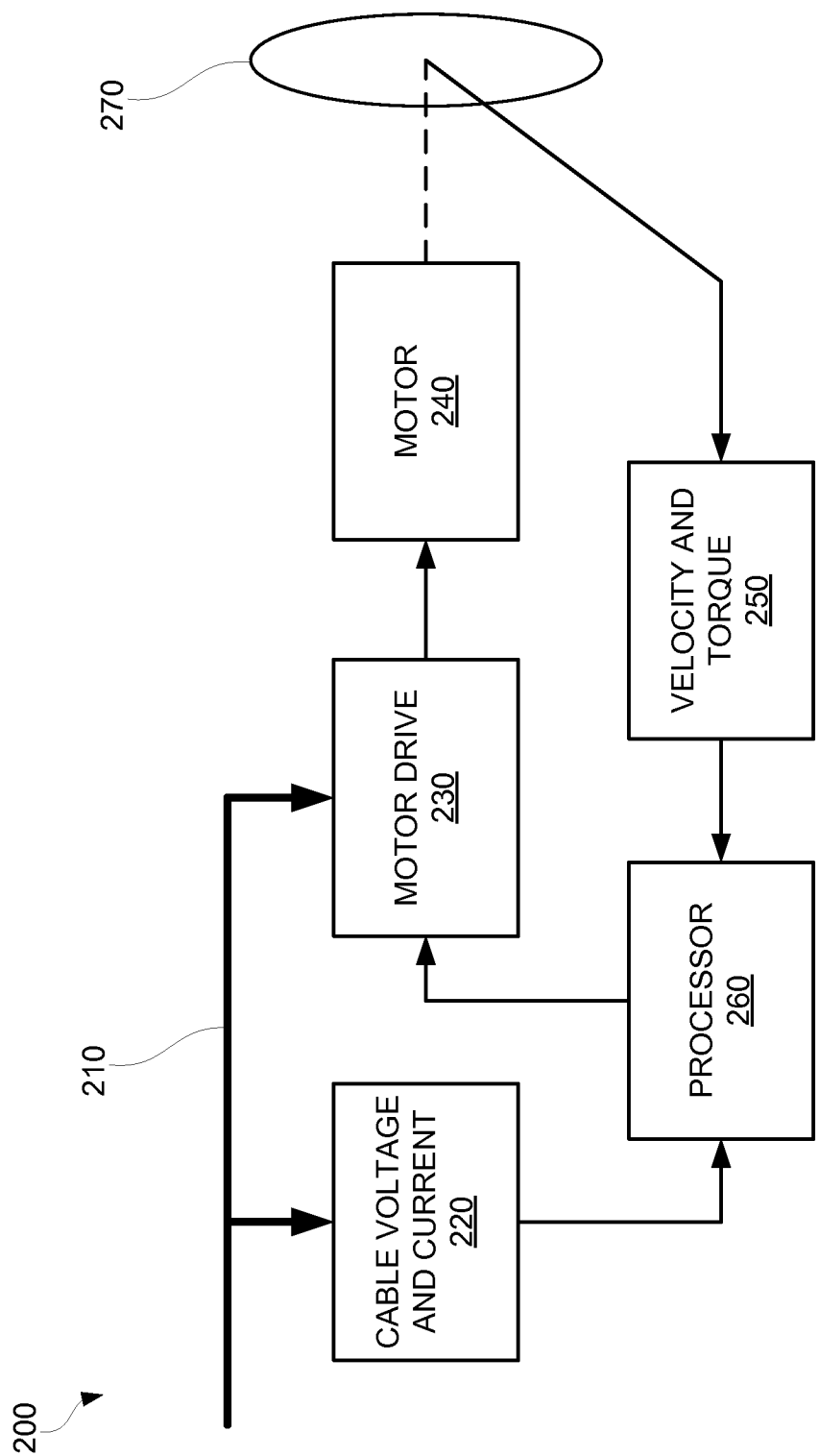
FIG. 2 is a graphical representation of example system for powering an electric motor in a well.

FIG. 2 is a graphical representation of example system 200 for powering an electric motor 240 (e.g., traction motor at the end of a logging cable) in a well. Cable 210 may extend into a well and be operatively coupled to a motor drive 230. Cable voltage and cable current 220 may be measured in the well adjacent and/or at motor drive 230. Motor drive 230 may be operatively coupled to electric motor 240. Electric motor 240 may have associated velocity and torque control parameters 250 related to the operation of electric motor 240 while performing a task 270 (e.g., conveying tools, taking formation cores, operating valves, milling plugs) in the well. Cable voltage and cable current 220 and velocity and torque control parameters 250 may be inputted to a processor 260. Processor 260 may be coupled to motor drive 230 to adjust the operating parameter(s) of electric motor 240 to approximate and/or equal the maximum power available at the end of cable 210.

In some examples, electric motor 240 could be a DC motor. In some examples, motor drive 230 may be a buck converter configured to adapt the cable voltage and current to the electric motor's 240 excitation voltage. In a DC brushless example, motor drive 230 may include pulse width modulation to modulate the cable voltage to excite the three phase coils to generate a rotating magnetic field in electric motor 240, as well as adapting the excitation voltage and current to the cable voltage and current. Many configurations and topologies are known to those skilled in the art to implement such functions.

In some examples, velocity and torque are parameters in conventional motor controls. In some examples, velocity data may be integrated to obtain or determine position information. In some examples, the product of velocity (Vel) and torque (Torq) may define the power absorbed by electric motor 240, and may be used as another control variable and inputted in the following control equation:

$$\text{Vel} \times \text{Torq} \leq \eta \cdot W_{max},$$

where $\eta$ is the allowed conversion efficiency inherent to any power conversion system. In some examples, average motor voltage and average motor voltage current may be used instead of velocity and torque, respectively.

In some examples, processor 260 may be (or be based on) a specialized microprocessor or DSP configured to receive velocity and torque control parameters 250 and control pulse width modulation switching on the motor excitation phase coils to generate the corresponding rotating magnetic vector (as determined by velocity and/or torque settings). In some examples, processor 260 may also receive cable voltage and cable current 220, and may calculate the maximum power available from cable 210. In some examples, processor 260 may also calculate the power equation described above and may adjust an appropriate velocity and/or torque setting in an added control loop to maintain the inequality.

The present disclosure contemplates that a control loop may appear difficult to implement with the inherent product calculation in real time. However, it can be greatly simplified. For example, in a system where the surface power supply is fixed, processor 260 may determine the cable voltage at which the power delivered by cable 210 is at its maximum, and it may control the velocity setting to prevent the cable voltage from going any lower than that determined cable voltage. In another example, in a system where the surface supply system implements a feed forward compensation that keeps the cable voltage constant, processor 260 may determine the current at which the power transfer on cable 210 is maximized, and it may control the velocity setting to prevent the cable current from going any higher than that determined cable current. The effects of these example control policies are equivalent to the power equation described above.

Figure 3:
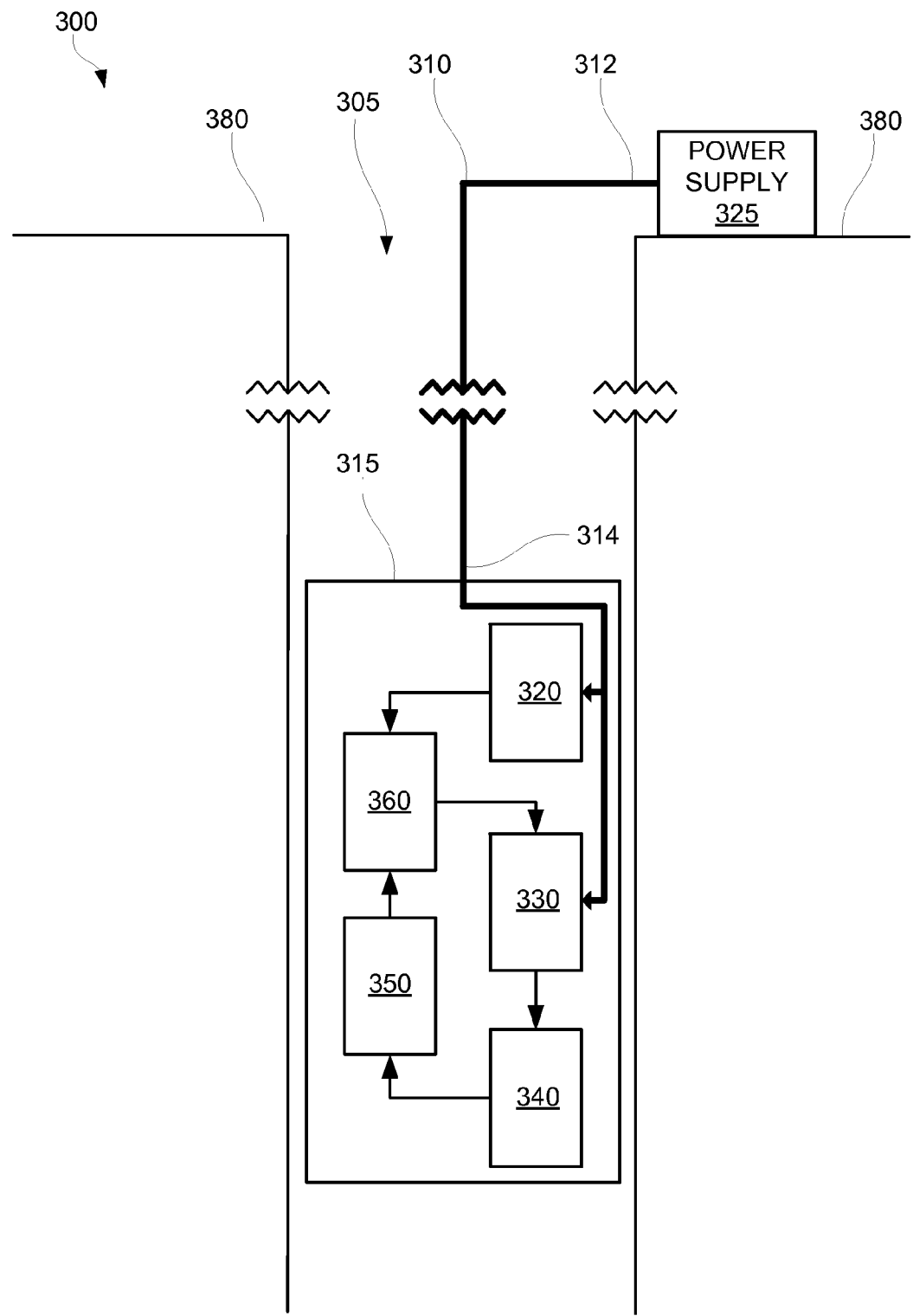
FIG. 3 is a graphical representation of an example system for powering a downhole tool having an electrical load in a well.

FIG. 3 is a graphical representation of an example system 300 for powering a downhole tool 315 having an electrical load 340 in a well 305. In some examples, a power supply 325 may be located at the Earth's surface 380 and may be coupled to downhole tool 315 via a cable 310. Cable 310 may include an end 312 coupled to power supply 325 and an end 314 coupled to downhole tool 315. A cable voltage and cable current 320, a power convertor 330, a load 340, a load control parameters 350, and/or a processor 360 may be disposed within downhole tool 315. Processor 360 may be coupled to power converter 330 to adjust the operating parameter(s) of load 340 to approximate and/or equal the maximum power available at the end of cable 310.

Figure 4:
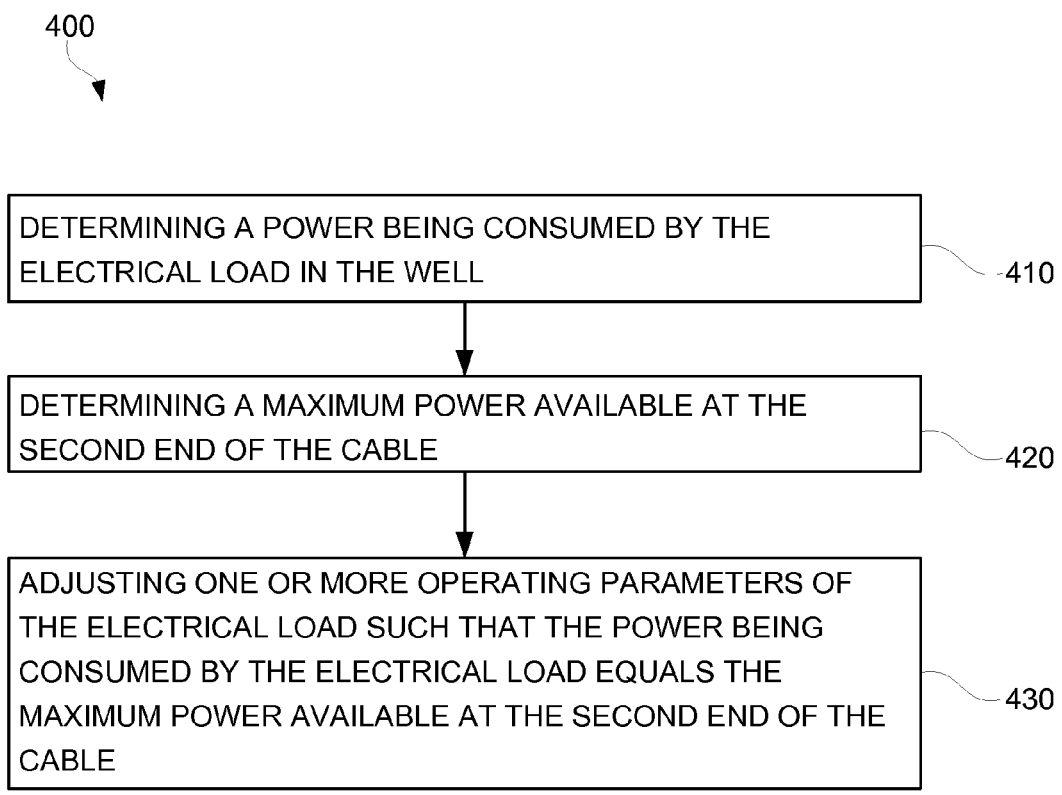
FIG. 4 is a flowchart of an example method of controlling an electrical load in a well, each arranged in accordance with at least an embodiment of the present disclosure.

FIG. 4 is a flowchart of an example method 400 of controlling an electrical load in a well, in accordance with at least some embodiments of the present disclosure. Example method 400 may include determining 410 the power being consumed by the electrical load in the well. Example method 400 may continue by determining 420 the maximum power available at the end of the cable coupling the electrical load to a surface power supply. Example method 400 may also include adjusting 430 operating parameter(s) of the electrical load such that the power being consumed by the electrical load equals and/or approximates the maximum power available at the end of the cable.

In one embodiment, a system for powering an electrical load is disclosed, the system comprising a power supply, a power converter coupled to the power supply via a cable having a first end coupled to the power supply and a second end coupled to the power converter, the power converter configured to: measure a power being consumed by the electrical load and adjust at least one operating parameter of the electrical load based, at least in part, on a maximum power available at the second end of the cable. In another embodiment, a system is disclosed comprising a battery, a power converter coupled to the battery, the power converter configured to measure a power being consumed by the electrical load in the well and adjust at least one operating parameter of the electrical load based, at least in part, on a maximum power available from the battery. In another example embodiment, a method of controlling an electrical load is disclosed, the electrical load being coupled to a power converter via a cable having a first end coupled to a surface power supply and a second end coupled to the power converter, the method comprising: determining a power being consumed by the electrical load; determining a maximum power available at the second end of the cable; and adjusting at least one operating parameter of the electrical load such that the power being consumed by the electrical load equals the maximum power available at the second end of the cable.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for powering an electrical motor disposed in a well, the system comprising:
   a power supply;
   a motor drive circuit coupled to the power supply via a cable having a first end coupled to the power supply and a second end coupled to the motor drive circuit, the motor drive circuit configured to:
   measure a power being consumed by the electrical motor; and
   adjust at least one operating parameter of the electrical motor based, at least in part, on a maximum power available at the second end of the cable, wherein the motor drive circuit is further configured to measure the power being consumed by the electric motor based, at least in part, on at least one of a velocity of the electric motor, a torque of the electric motor, an average motor voltage of the electric motor, or an average motor current of the electric motor, wherein the power supply includes a feed-forward loop that maintains a constant voltage at the second end of the cable, and wherein the motor drive circuit is configured to adjust a velocity of the electric motor to maintain a current at the second end of the cable at or below a maximum power transfer current.

2. The system of claim 1, wherein the motor drive circuit is further configured to adjust the at least one operating parameter of the electrical motor such that the power being consumed by the electrical motor equals the maximum power available at the second end of the cable.

3. The system of claim 1, wherein the motor drive circuit is further configured to adjust the at least one operating parameter of the electrical motor to operate the electrical motor at the maximum power available at the second end of the cable.

4. The system of claim 1, wherein the power convertor is further configured to continuously measure the power being consumed by the electrical motor.

5. The system of claim 1, wherein the power convertor is further configured to periodically measure the power being consumed by the electrical motor.

6. The system of claim 1, further comprising:
a processor in electrical communication with the cable and the motor drive circuit, the processor configured to measure a cable voltage and a cable current, and further configured to calculate the maximum power available at the second end of the cable based, at least in part, on the cable voltage and the cable current.

7. The system of claim 1, wherein the power supply is located on a surface of the Earth; and
wherein the motor drive circuit is further configured to receive from the surface a measurement representative of the maximum power available at the second end of the cable.

8. The system of claim 1, wherein power supplied by the power supply has a fixed voltage; and
wherein the motor drive circuit is configured to adjust a velocity of the electric motor to maintain a voltage at the second end of the cable at or above a maximum power transfer voltage.

9. A system for powering an electrical motor disposed in a well comprising:
a battery;
a motor drive circuit coupled to the battery via a cable having a first end coupled to the battery and a second end coupled to the motor drive circuit, the motor drive circuit configured to:
measure a power being consumed by the electrical motor in the well; and
adjust at least one operating parameter of the electrical motor based, at least in part, on a maximum power available from the battery, wherein the motor drive circuit is further configured to measure the power being consumed by the electric motor based, at least in part, on at least one of a velocity of the electric motor, a torque of the electric motor, an average motor voltage of the electric motor, or an average motor current of the electric motor, wherein the battery includes a feed-forward loop that maintains a constant voltage at the second end of the cable, and wherein the motor drive circuit is configured to adjust a velocity of the electric motor to maintain a current at the second end of the cable at or below a maximum power transfer current.

10. The system of claim 9, wherein the motor drive circuit is further configured to adjust the at least one operating parameter of the electrical motor such that the power being consumed by the electrical motor equals the maximum power available at the battery.

11. The system of claim 9, wherein the motor drive circuit is further configured to adjust the at least one operating parameter of the electrical motor to operate the electrical motor at the maximum power available at the battery.

12. A method of controlling an electrical load, the electrical load being coupled to a power converter via a cable having a first end coupled to a surface power supply and a second end coupled to the power converter, the method comprising:
determining a power being consumed by the electrical load;
determining a maximum power available at the second end of the cable; and
adjusting at least one operating parameter of the electrical load such that the power being consumed by the electrical load equals the maximum power available at the second end of the cable, wherein determining the maximum power available at the second end of the cable comprises:
measuring a cable voltage of the cable and a cable current of the cable;
calculating a cable resistance of the cable based, at least in part, on the cable voltage and the cable current; and
calculating the maximum power available at the second end of the cable based, at least in part, on the cable resistance.

13. The method of claim 12, wherein determining the maximum power available at the second end of the cable comprises:
measuring a cable voltage of the cable and a cable current of the cable;
calculating the maximum power available at the second end of the cable based, at least in part, on the cable voltage and the cable current.

14. The method of claim 12, receiving, via telemetry, at least one of a cable voltage of the cable, a cable current of the cable, a cable resistance of the cable, or a measurement representative of the maximum power available at the second end of the cable.

15. The method of claim 12, further comprising:
determining a maximum power transfer voltage; and
adjusting a velocity of the electrical load to maintain a voltage at the second end of the cable at or above the maximum power transfer voltage.

16. The method of claim 12, determining a maximum power transfer current; and
adjusting a velocity of the electrical load to maintain a current at the second end of the cable at or below a maximum power transfer current.

* * * * *